United States Patent [19]

Marion

[11] Patent Number: 5,031,730
[45] Date of Patent: Jul. 16, 1991

[54] SAFETY BRAKE

[76] Inventor: René André57 rue Exelmans Marion, 78000 Versailles, France

[21] Appl. No.: 424,818

[22] Filed: Oct. 20, 1989

[30] Foreign Application Priority Data

Oct. 25, 1988 [FR] France .................................. 8813930
Jun. 26, 1989 [FR] France .................................. 8908455

[51] Int. Cl.[5] ........................ F16D 65/14; B60T 13/22
[52] U.S. Cl. ..................................... 188/180; 188/110; 188/151 A; 188/170; 188/185; 188/382; 246/172; 246/199
[58] Field of Search .................... 188/151 A, 170, 185, 188/181 R, 180, 380, 110, 111; 246/172, 199

[56] References Cited

U.S. PATENT DOCUMENTS

| 878,263 | 2/1908 | Winsor | 246/172 X |
| 2,451,326 | 10/1948 | Eksergian et al. | 188/217 X |
| 3,035,666 | 5/1962 | Beeskow | 188/217 |
| 3,557,913 | 1/1971 | Russler | 188/170 X |

FOREIGN PATENT DOCUMENTS

| 71485 | 11/1892 | Fed. Rep. of Germany . |
| 004504 | 3/1957 | Fed. Rep. of Germany ... 188/151 A |
| 3630681 | 10/1988 | Fed. Rep. of Germany . |
| 423624 | 4/1911 | France . |
| 1186948 | 9/1959 | France . |

Primary Examiner—George E. A. Halvosa
Attorney, Agent, or Firm—Griffin, Branigan & Butler

[57] ABSTRACT

A safety brake for braking a moving member includes at least one active member co-operating by friction with a passive member. The active member is kept at a distance from the passive member by an incompressible fluid which opposes the effect of a drive element (7) that is coupled to the active member and tends to urge the active member against the passive member. The incompressible fluid is enclosed in a circuit (6) which possesses a frangible portion (8) such that when the frangible portion is broken in order to activate the safety brake, it constitutes an exhaust opening to allow the incompressible fluid to escape from the circuit (6).

9 Claims, 3 Drawing Sheets

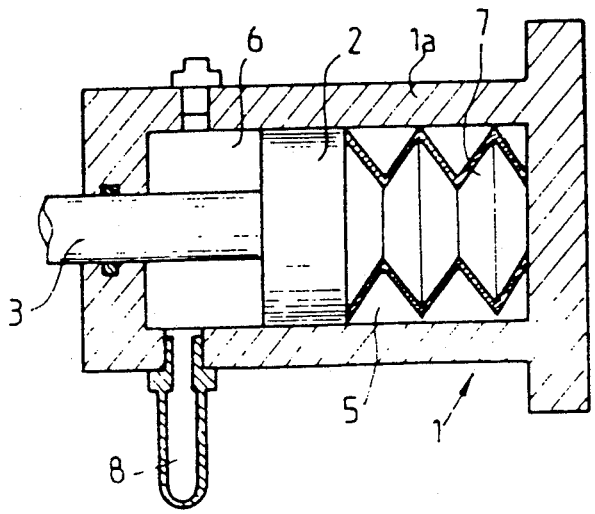
FIG_1
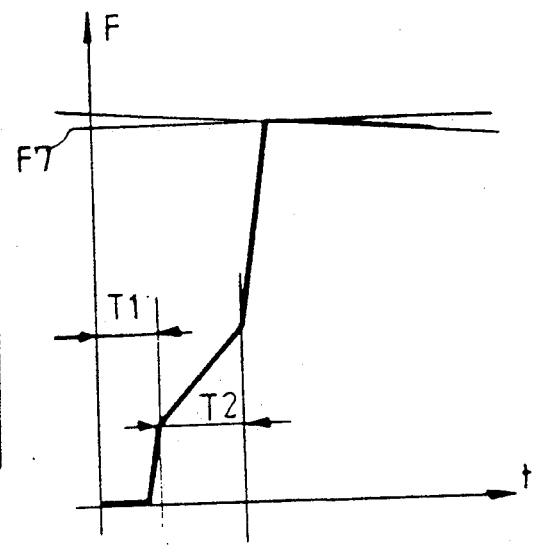
FIG_7
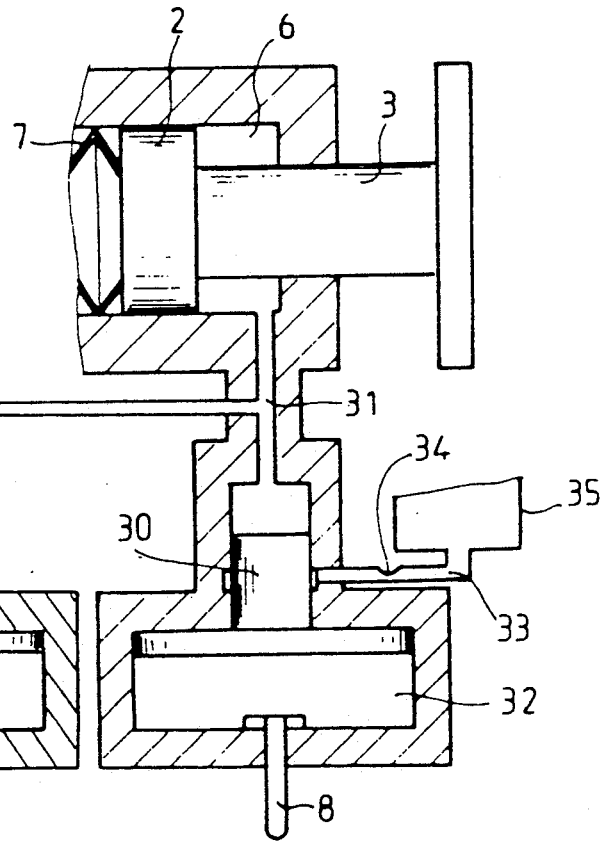
FIG_6

SAFETY BRAKE

The present invention relates to a safety brake for a moving member which may be self-propelled, in which case the brake is on board the member, or which may be driven by an external member (cable, chain, . . . ), in which case the brake may be mounted either on the moving member or else on a driving member, or finally it may be mounted on a pulley associated with an auxiliary safety cable as used, for example, in a lift or elevator for people or goods.

BACKGROUND OF THE INVENTION

Safety brakes are known per se and rely on releasing a previously prepared mechanism which serves, either directly or indirectly, to move one or more friction bodies towards each other should the moving member exceed a reference value (speed or length of stroke). Several types of actuator mechanism are known, and they may include a spring mechanism which is latched in a state of accumulated energy, or else a counter-weight mechanism which is held in a "high" position. At least some such latching or holding means include a hydraulic circuit generating a pressure which opposes the release of the energy accumulated by the brake members actuator mechanism. The pressure in this circuit is lost or reduced in response to an emergency stop signal generated by a sensor, e.g. a sensor for sensing excess speed or position of the moving member. These prior systems suffer from the drawback of using electrical or electronic sensors which are relatively fragile and which therefore require considerable care and maintenance.

The invention seeks to provide a safety brake of much simpler construction and with much simpler maintenance requirements, and suitable for being implemented in conjunction with numerous moving members.

SUMMARY OF THE INVENTION

To this end, the present invention provides a safety brake for a moving member, the brake including at least one active member co-operating by friction with a passive member, the active member being held at a distance from the passive member by an incompressible fluid opposing the effect of a drive element coupled to the active member and tending to urge the active member against the passive member, wherein the incompressible fluid is enclosed in a circuit possessing at least one frangible portion which, when broken to put the safety brake into operation, constitutes an escape opening via which the incompressible fluid leaves the circuit.

The frangible portion is situated on the path followed by a striker whose motion depends on the motion of the moving member to be braked, and which strikes the frangible portion when a reference value for the motion of the moving member is reached or exceeded.

If this reference value is a speed, then the striker is constituted by any one of a plurality of weights in a centrifugal speed governor including a rotary hub lying in a substantially vertical plane, coupled to the moving member to be braked, and provided with at least one radial guide in which at least one elongate weight is slidably mounted to slide between two radially extreme positions.

When the reference value is a position corresponding to the end of a stroke, the striker is constituted by an abutment which encounters the frangible portion when the displacement of the moving member has exceeded said position.

When braking vehicle transporting people, the application of too high a braking force is not recommended since that could cause the people to be decelerated in a manner they could not withstand without injury. In such an application, the incompressible fluid circuit may include two parallel branches, one of which has a calibrated narrow section while the non-restricted branch includes a moving shutter member constrained to move with the active member between a first position in which it leaves the non-restricted branch open and a second position in which it closes it, said second position being reached when the active member has travelled a determined approach stroke towards the passive member.

In a variant implementation of this application the compressible fluid circuit includes two successive portions which are isolated from each other by a wall which is moveable between two positions defining a swept volume corresponding to an approach stoke of the active member towards the passive member, with the moving wall, when in its second position, establishing communication between the upstream portion of the hydraulic circuit and a calibrated discharge channel.

In both of these variants, it is advantageous for one of the active and passive members (and preferably the active member) to carry its friction surface which co-operates with the other member via a moving part that engages a compressible member of limited stroke, with the compression force being less than the force developed by the drive member.

BRIEF DESCRIPTION OF THE DRAWINGS

Embodiments of the invention are described by way of example with reference to the accompanying drawings, in which:

FIG. 1 shows a first embodiment of trip means for a brake of the invention;

FIG. 6 shows a second variant of the FIG. 4 embodiment in which braking takes account of two degrees of loading on a lift or elevator; and FIG. 7 is a graph showing braking force as a function of time after the frangible portion has been ruptured.

DETAILED DESCRIPTION

Figure 3:
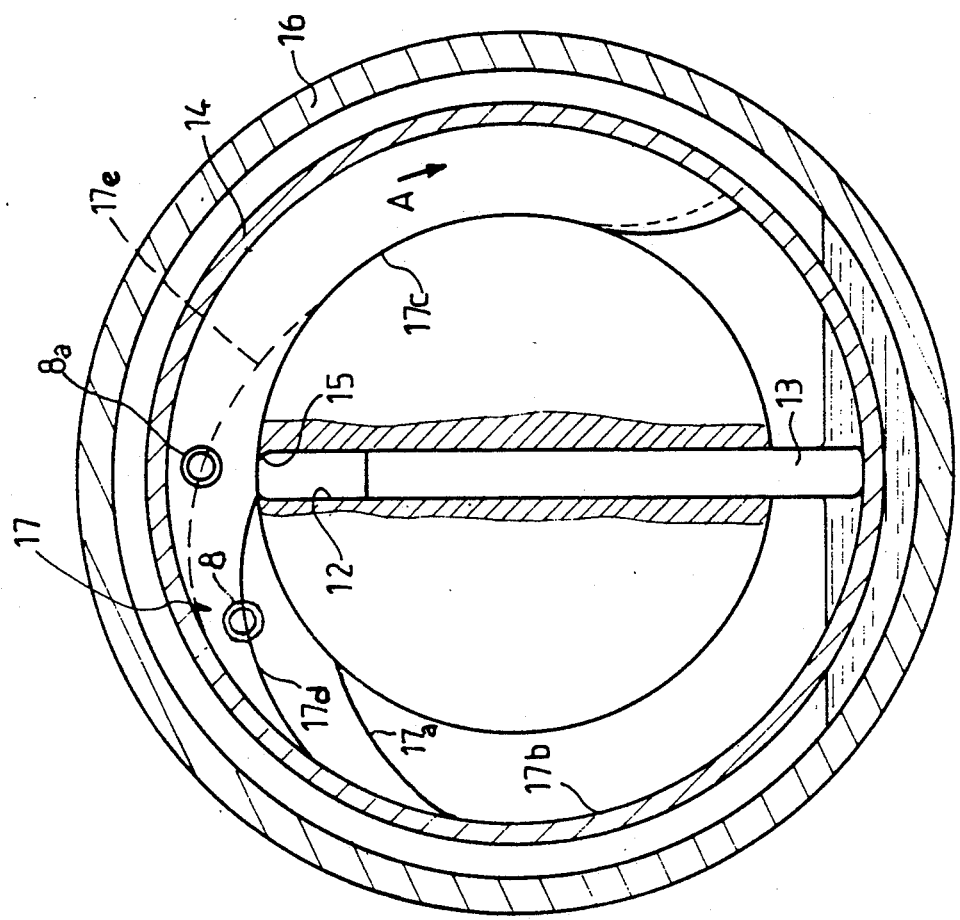
FIG. 3 is a section on line III—III of FIG. 2, showing the curve described by the active ends of the weights in normal operation and in emergency operation.

Referring initially to FIG. 1, a drive element 1 is constituted by an actuator comprising a cylinder 1a, whose piston 2 is extended by a rod 3 which is coupled to the active member of a brake in accordance with the invention. The active member may be constituted by the rod 3 itself carrying a friction body (not shown) at its free end and placed facing a friction surface fixed to or driven by the moving member to be braked (also not shown). The active member may also be a separate element which is held away from the passive element of the brake by the rod 3 of the piston which then acts as a latching finger for said separate element and it opposes the effect of an energy store (spring, counterweight, ...) which tends to urge the active member towards the passive member.

The piston 2 divides the cylinder 1a of the actuator 1 into two chambers, 5 and 6, with the chamber 5 being fitted with a spring 7 (in this case a stack of spring washers) which tend to urge the rod 3 out from the cylinder, with the chamber 6 being a hydraulic chamber for preventing the piston 2 from moving and being closed in sealed manner. The chamber 6 has an extension 8 in the form of a frangible appendix projecting outside the actuator cylinder 1a. It will be observed that when the rod 3 constitutes the active member of the brake, it is possible to implement a plurality of actuators 1 which act together on a common friction body, with the chambers 6 being interconnected by a common hydraulic circuit including the above-mentioned frangible appendix. It will be understood that braking the appendix causes the, or each, chamber 6 in the associated hydraulic chamber to be purged, thereby releasing the energy stored by the spring in the, or each, chamber 5, thus extending the rod(s) 3 and consequently activating the brake.

The frangible appendix 8 needs to be broken at the moment when the brake is to be operated, i.e. by a striker whose path encounters the appendix when the moving member to be braked is outside its normal operating range (excess speed or abnormal length of stroke). It will be understood that relative motion needs to be established between the appendix and the striker in a manner that depends on the factor which trips the safety brake. When that factor is the end of a stroke, then the striker may be constituted by a fixed abutment situated on the path of the moving member which carries the brake including its trip device, particularly when the moving member is self-propelled. If the moving member is externally driven, then the brake may be situated on a winch or on a safety cable and the abutment carried by the moving member for braking the frangible tube may be installed in fixed manner on the guide structure for the moving member.

When the application is to brake a moving member that is travelling too fast, then the striker should be carried by a device which is sensitive to speed, e.g. a speed governor including weights which follow different paths depending on the speed of rotation of the governor.

Figure 2:
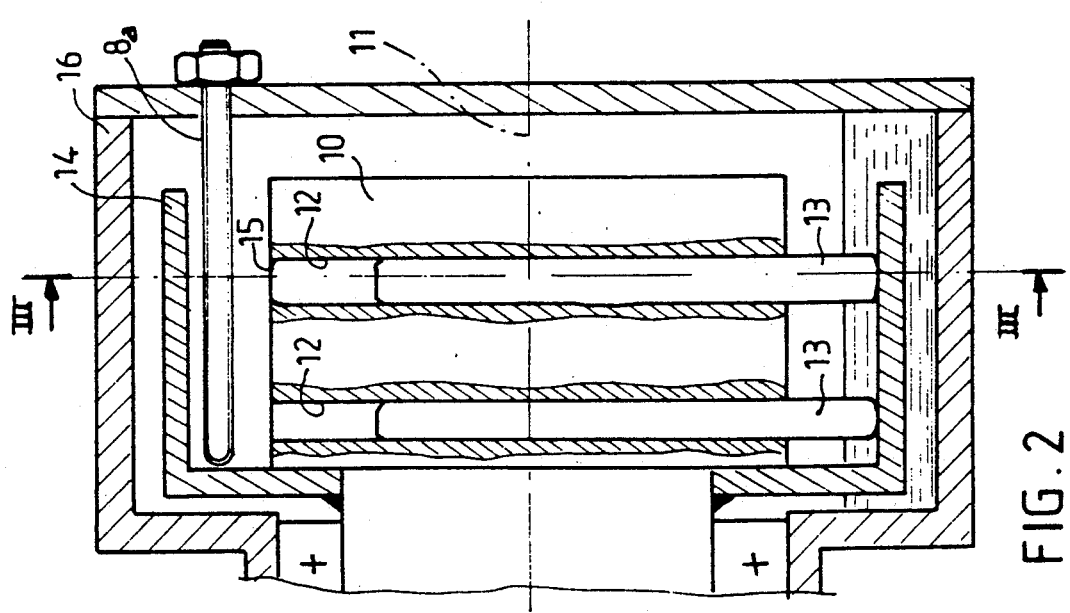
FIG. 2 is an axial section through a governor in accordance with the invention.

FIG. 2 is a diagram in axial section through a governor in accordance with the invention. The governor comprises a hub 10 rotated about a horizontal axis 11. The hub may be driven either by running over a fixed guide for the moving member, or else by the running of a cable connected to the moving member, which cable may either be a traction cable if the moving member is drawn by cable, or else an auxiliary cable such as a safety cable. The hub thus rotates at a speed which is proportional to the speed of the moving member. The hub 10 includes radial guides 12 in which cylindrical weights 13 are slidably mounted. The hub 10 includes a rotary hood 14 constituting a radial abutment for the weights 13, both when the effect of gravity is greater than the effect of centrifugal force, and vice versa. It will be observed that each radial guide 12 may be reduced in size at one of its ends, as indicated at 15 in FIG. 2. The weights are thus prevented in normal operation from striking the rotary hood 14 twice per revolution. The hub and the hood are enclosed in a housing 16 which is fixed and which contains a bath of oil into which the weights dip. The radial motion of the weights ensures lubrication of their sliding motion along the guides 12.

The hub shown in FIGS. 2 and 3 may have four weights situated along diameters which are offset along the axis 11.

The curve 17 described by the projecting end of each weight when the hub 11 rotates in direction A is shown in FIG. 3. This curve results from the combined effects of centrifugal force, gravity, and sliding friction between the weight and its guide. At a first given speed, the portion 17a of this curve is the portion during which the effect of gravity overcomes centrifugal force and resistance to sliding due to friction. The end of the weight thus moves from its radially outermost position (circular arc 17b) to its radially innermost position (circular arc 17c), i.e. with its opposite end resting against the restricted portion 15. As the speed of the hub increases, the transition from level 17b to 17c is offset in the direction of rotation A since the centrifugal force to be overcome increases. It can thus be understood that the frangible portion 8 of the apparatus shown in FIG. 1 can be placed in the proximity of that one of the transition curves 17a, 17d, 17e which corresponds to the limit speed at which the safety brake is to be tripped.

A moving member may be provided with a brake that operates because it is going too fast, with a brake that operates because it has exceeded a limiting position, or both. If it has both, it is preferable to use the same brake members in both cases in conjunction with separate trip mechanisms. Thus, for example, the cabin of a lift or elevator may be fitted with a safety cable which is fixed to the cabin and which rotates a pulley mounted on a stationary axle at the top of the installation. The pulley is coupled to a governor similar to that shown in FIG. 3 and is capable of being braked, thereby braking the safety cable, said brake including a trip member whose hydraulic circuit includes at least two frangible portions, one of the portions engaging the governor and the other engaging an end-of-stroke abutment marking the end of downwards travel for the cabin. A third frangible portion could also be provided for engaging an abutment at the opposite end of the cabin's stroke, assuming that there is a need to provide protection against the cabin being raised too high, e.g. due to too small a load and a failure in the drive mechanism and its brake, thereby allowing the cabin to be raised by its counterweight weighing more than the cabin. It is perfectly possible to include a fixed connecting duct in the hydraulic circuit running along the entire length of the shaft and interconnecting two frangible portions of the hydraulic circuit.

It may be observed that putting an installation back into operation after the safety mechanism has tripped is extremely easy. The broken tube needs to be replaced, and then the hydraulic circuit needs to be pumped back up to its nominal pressure, by means of a simple hand pump.

Figure 4:
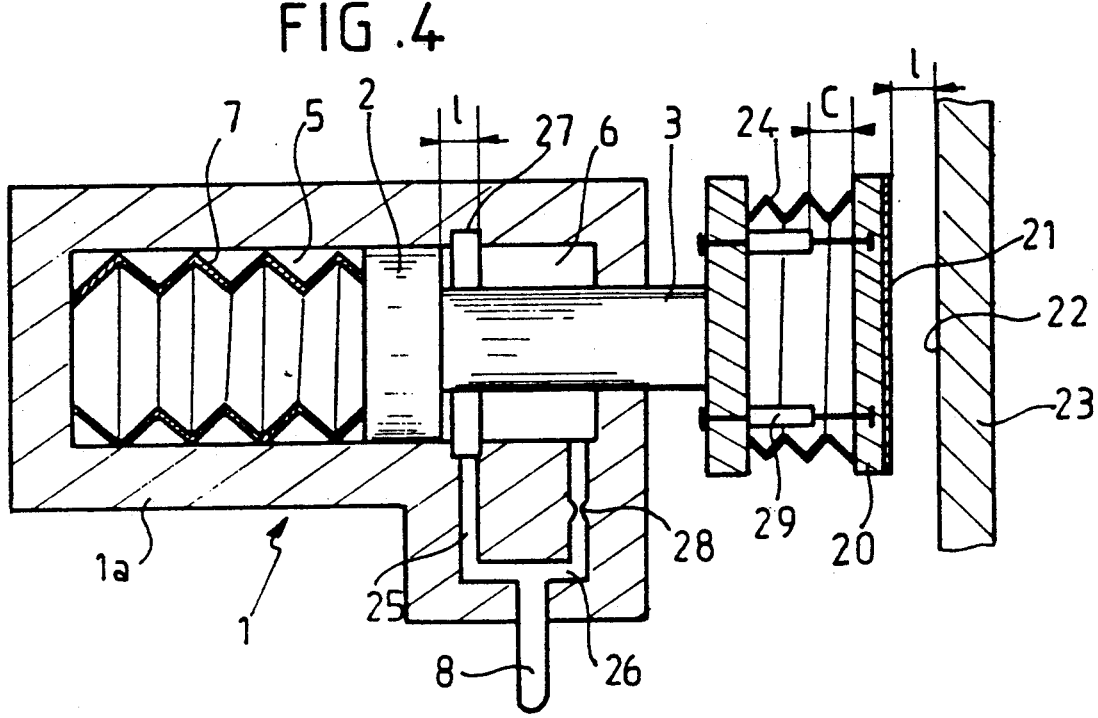
FIG. 4 is a diagram of a brake of the invention in which the braking force is applied progressively.

In FIG. 4, items which have already been described have the same references. This figure shows the active member of the brake at the end of the rod 3. This member is a brake pad 20 having a friction coating 21 facing a friction surface 22 fixed on the passive member 23 of the brake. It may be observed that the pad 20 is retained on the rod 3 against the effect of a compression spring 24 (a stack of spring washers) capable of being compressed over a stroke C when the braking force exceeds the prestress of the spring. In other words, the force of the drive member (spring 7) is much greater than the compression force required for compressing the spring 24.

The chamber 6 communicates with the frangible appendix 8 via two parallel branches 25 and 26 of a connection duct, with the branch 25 which is closer to the piston 2 when the brake is ready to be tripped opening out into a groove 27 provided in the chamber 6, and with the branch 26 being fitted with a calibrated restriction 28.

When the appendix is broken, the fluid in the chamber 6 escapes suddenly via both branches 25 and 26, but mainly via the branch 25 which does not resist the flow of the fluid.

The piston 2 is thus urged rapidly towards the right in the figure until it has gone past the further edge of the groove 27. The stroke 1 then travelled by the moving equipment 2, 3, 20 corresponds to an approach stroke and takes place over a very short period of time. The branch 25 is then shut off by the piston 2 and the fluid can then only escape from the chamber via the restriction 28 which is calibrated to define a much slower displacement speed for the moving equipment.

During this second displacement stage, the brake pad is applied against the member 22, 23 by a force which is equal to the precompression force of the spring 24, and this force then increases as the spring is compressed further. FIG. 7 shows the change in braking force as a function of time: zone T1 corresponds to the approach stage; and zone T2 corresponds to the action of the brake pad while the spring is compressed to a value C. The slope of the curve in the zone T2 depends on the value of the restriction 28. The end of the stroke C is marked by the brake pad 20 coming into abutment against spacers 29 or by the spring washers constituting the spring 24 becoming fully compressed. Once the moving equipment has become axially rigid, then the braking force is constituted by the force F7 provided by the drive member (i.e. the spring 7). Depending on the weight of the installation to be braked, the maximum admissible deceleration, the maximum allowable braking time, etc., the springs 7 and 24 are designed to make it possible to stop the installation within the zone T2 of the graph with the force F7 being a static holding force equal to a multiple of the moving load (with the exact value being fixed by regulations).

It will be understood that this variant of the brake makes it possible to determine the manner in which the braking force is applied.

Figure 5:
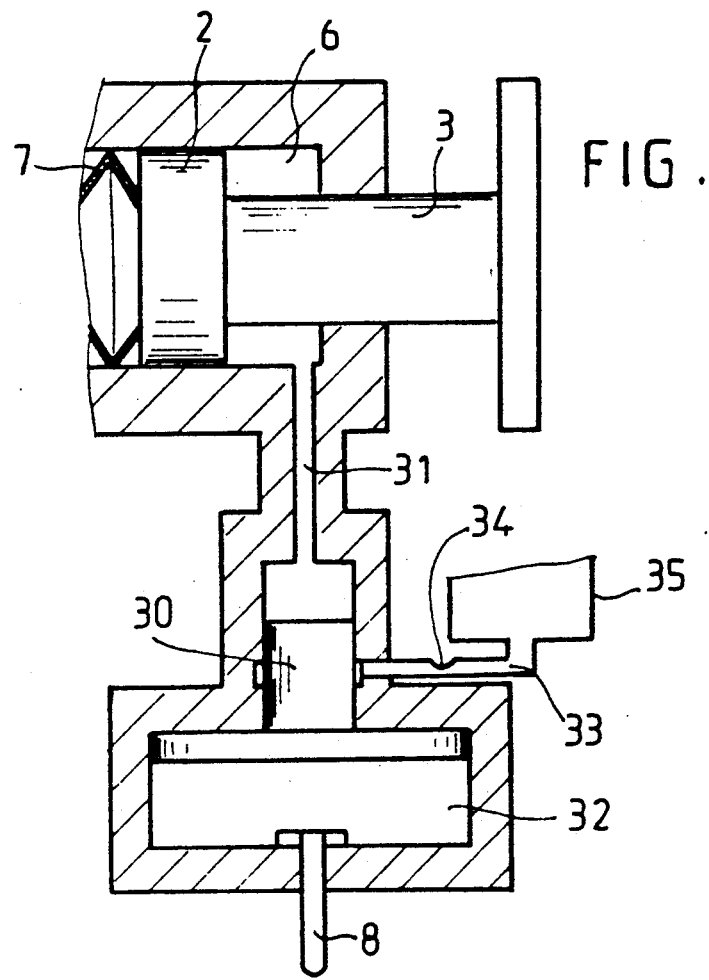
FIG. 5 shows a variant of the FIG. 4 embodiment.

FIG. 5 shows a variant of the FIG. 4 embodiment in which the hydraulic duct includes a moving wall 30 between the chamber 6 and the frangible portion 8, said wall splitting the circuit into an upstream portion 31 and a downstream portion 32 situated adjacent to the frangible portion. The upstream and downstream portions are isolated from each other and when the frangible portion 8 is broken, the moving wall moves towards the broken portion since there is no longer any fluid pressure to restrain it. As it moves, this wall sweeps a volume which forms a reserve for absorbing the fluid flowing out from the chamber 6, with this volume corresponding to the approach stroke C of the moving equipment towards the passive member 22, 23 of the brake. This moving wall (which is in the form of a piston 30 in this case) comes into abutment against a fixed member, and in this position it uncovers a discharge duct 33. The discharge duct 33 has a restriction 34 that performs the same function as the restriction 28 in the preceding figure. The liquid escaping via this restricted duct is collected in a tank 35 thus ensuring that the necessary volume of fluid is available when the brake is put back into the ready position. The curve of applied braking force is identical in this case with that shown in FIG. 7. Finally, it may be observed that the wall 30 constitutes an isolating piston between the upstream and downstream lengths 31 and 32 of the hydraulic circuit, thus very considerably limiting liquid losses. The piston is a stepped piston in this case to show that it acts as a pressure divider. It may be necessary for the pressure behind the frangible portion to be less than the pressure within the chamber 6, e.g. to avoid applying too great a force against the wall of said frangible portion.

FIG. 6 shows an embodiment of the invention including means to take account of possible variation in the load on the moving member to be braked. It is assumed that the embodiment shown in FIG. 5 is adjusted for an average load and that the stroke required for stopping a lift is then acceptable. However, in some cases variations in load may be large, such that an average adjustment is unsatisfactory for maximum load. It will be understood that when the tube brakes, the friction due to the spring 24 on its own may not be sufficient to slow down the load to be braked, and that its speed may continue to increase before decreasing, with the drive force 7 then being applied late to the detriment of the stopping distance required for braking. In this case, a second frangible tube 8a is provided enabling an additional volume of the chamber 6 to be purged rapidly in parallel with the slow purge via the restricted duct 33, thereby reducing the time required to compress the spring 24 and thus allowing the full force of the drive member 7 to be applied sooner. The tube 8a is disposed on the governor shown in FIGS. 2 and 3 on a path 17e followed by the end of a weight 13 if the moving member to be braked reaches a speed greater than the speed which has already caused the frangible portion 8 to be broken, and corresponding to a load on the moving member which is considerably greater than the average load for which the brake is adjusted in order to obtain an acceptable stopping distance. Naturally, the number of frangible tubes may be further increased in order to take finer account of differences in the load that needs to be braked.

The invention is not limited to the description given above. On the contrary, it extends to any variant that may be applied thereto without going beyond its scope, for example, the hydraulic circuit could be replaced by a pneumatic circuit. It may also be observed that the hydraulic circuit may include a store of fluid under pressure (e.g. an oleopneumatic system), associated with a pressure sensor for triggering an alarm if the pressure in the installation drops to a dangerously low level.

I claim:
1. A safety brake for a moving member, the brake including at least one active member cooperating by friction with a passive member, the active member being held at a distance from the passive member by releasable locking means opposing the effect of a drive element coupled to the active member and tending to urge the active member against the passive member, said locking means cooperating with releasing means comprising a centrifugal speed governor having a rotary hub rotating in a substantially vertical plane and coupled to the moving member to be braked, the hub being provided with at least one radial guide in which an elongated weight is slidably mounted to slide be- tween two extreme radial positions, wherein said releasable locking means include incompressible fluid enclosed in a circuit possessing at least one frangible portion which, when broken by said weight at one of its radial positions to put the safety brake into operation, constitutes an escape opening via which the incompressible fluid leaves the circuit.

2. A brake according to claim 1, wherein the incompressible fluid circuit includes at least two parallel branches, a first one of said branches having a calibrated restricted section and the brake including a closing member for shutting off a second of said branches without such a restriction, said closing member moving together with the active member between a first position in which it leaves the second branch open and a second position in which it closes off said second branch, said second position being reached when the active member has traveled the length of a determined approach stroke towards the passive member.

3. A brake according to claim 1, wherein the incompressible fluid circuit includes a duct connected in parallel with a discharge channel and having a restricted section, said duct including a second frangible portion.

4. A brake according to claim 3, wherein the second frangible portion is separated from an upstream portion of its duct by a moving piston.

5. A brake according to claim 1, wherein one of the active and passive members carries a friction surface cooperating with the other one of said passive and active members via a part that is movable against a compressible member over a limited stroke, wherein a compressive force required to cause one of the active and passive members to be movable over said stroke is less than a force developed by said drive element.

6. A brake according to claim 1, wherein the incompressible fluid circuit includes two successive portions which are isolated from each other by a piston movable between two positions defining a swept volume corresponding to an approach stroke of the active member towards the passive member, the moving piston, when in its second position, establishing communication between an upstream portion of the incompressible fluid circuit and a calibrated discharge channel.

7. A brake according to claim 6, wherein the incompressible fluid circuit includes a duct connected in parallel with said calibrated discharge channel, said duct including a second frangible portion.

8. A brake according to claim 7, wherein the second frangible portion is separated from an upstream portion of its duct by a moving piston.

9. A brake according to claim 6, wherein one of the active and passive members carries a friction surface cooperating with the other one of said passive and active members via a part that is movable against a compressible member over a limited stroke, wherein a compressive force required to cause one of the active and passive members to be movable over said stroke is less than a force developed by said drive element.

* * * * *